United States Patent
Jarvis et al.

(10) Patent No.: US 10,057,798 B2
(45) Date of Patent: Aug. 21, 2018

(54) METHODS AND SYSTEMS FOR MEASURING RANGE BETWEEN DEVICES

(71) Applicant: QUALCOMM Incorporated, San Diego, CA (US)

(72) Inventors: Murray Jarvis, Cambridge (GB); Paul Hiscock, Cambridge (GB); Benjamin Tarlow, Cottenham (GB); Nicolas Graube, Cambridge (GB); Ian Blair, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/261,413

(22) Filed: Sep. 9, 2016

(65) Prior Publication Data

US 2018/0077589 A1    Mar. 15, 2018

(51) Int. Cl.
| | |
|---|---|
| H04W 24/08 | (2009.01) |
| H04W 24/10 | (2009.01) |
| G01S 11/02 | (2010.01) |
| G01S 13/84 | (2006.01) |
| H04W 4/80 | (2018.01) |
| H04W 4/00 | (2018.01) |

(52) U.S. Cl.
CPC .......... *H04W 24/08* (2013.01); *G01S 11/02* (2013.01); *G01S 13/84* (2013.01); *H04W 24/10* (2013.01); *H04W 4/008* (2013.01); *H04W 4/80* (2018.02)

(58) Field of Classification Search
CPC ..... H04W 24/08; H04W 24/10; H04W 4/008; G01S 11/02; G01S 13/84
See application file for complete search history.

(56) References Cited

U.S. PATENT DOCUMENTS

| | | | |
|---|---|---|---|
| 9,736,640 B2* | 8/2017 | Aldana | H04W 4/023 |
| 2003/0195723 A1 | 10/2003 | Bensky et al. | |
| 2007/0268136 A1 | 11/2007 | Adamec et al. | |
| 2014/0004877 A1 | 1/2014 | Van et al. | |
| 2014/0056165 A1* | 2/2014 | Siomina | H04B 1/7083 370/252 |
| 2015/0087331 A1 | 3/2015 | Yang et al. | |
| 2015/0256972 A1 | 9/2015 | Markhovsky et al. | |
| 2015/0346349 A1* | 12/2015 | Taylor, Jr. | G01S 5/0263 342/357.24 |
| 2015/0351067 A1 | 12/2015 | Taylor, Jr. et al. | |
| 2016/0143065 A1 | 5/2016 | Gupta et al. | |
| 2017/0338855 A1* | 11/2017 | Raghupathy | H04B 1/7087 |

OTHER PUBLICATIONS

International Search Report and Written Opinion—PCT/US2017/045994—ISA/EPO—Nov. 11, 2017.
Verhagen S., et al., "On the Probability Density Function of the GNSS Ambiguity Residuals", GPS Solutions, Springer, Berlin, DE, vol. 10, No. 1, Feb. 1, 2006 (Feb. 1, 2006), XP019357601, pp. 21-28.

* cited by examiner

*Primary Examiner* — Duc C Ho
(74) *Attorney, Agent, or Firm* — Berkeley Law & Technology Group, LLP

(57) ABSTRACT

Disclosed are systems, devices and methods for determining a range between devices based, at least in part, on measurements of wireless tone signals transmitted between devices. In particular, two devices may measure tone signals transmitted between the two devices for determination of a round-trip phase measurement. Obtaining multiple round-trip measurements from tone signals transmitted at different carrier frequencies may enable resolving at least some range ambiguities.

30 Claims, 4 Drawing Sheets

---

302
Obtaining a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency 304
Determining a measurement of range between the first and second device based, at least in part, on the round-trip phase measurements

METHODS AND SYSTEMS FOR MEASURING RANGE BETWEEN DEVICES

BACKGROUND

Field

Embodiments described herein are directed to obtaining measurements of signals acquired from a transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a received signal strength (RSSI) or a round trip time (RTT) measured between transmission of a first message from a first device to a second device and receipt of a second message at the first device transmitted in response to the first message.

SUMMARY

Briefly, one particular implementation is directed to a method at a first device comprising: obtaining a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency; and determining a measurement of a range between the first and second device based, at least in part, on the RTP measurements.

Another particular implementation is directed to a first device comprising: a transceiver device; and one or more processing units configured to: obtain a plurality of round-trip phase (RTP) measurements based, at least in part, on wireless signals transmitted between the first device and a second device, wherein at least a first RTP measurement of the plurality of RTP measurements is based, at least in part, on acquisition at the transceiver device of one or more first wireless signals transmitted at a first carrier frequency and at least a second RTP measurement of the plurality of RTP measurements is based, at least in part, on acquisition at the transceiver device of one or more second wireless signals transmitted at a second carrier frequency; and determine a measurement of a range between the first and second device based, at least in part, on the RTP phase measurements.

Another particular implementation is directed to a non-transitory storage medium comprising computer-readable instructions stored thereon which are executable by a processing unit of a first device to: obtain a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency; and determine a measurement of a range between the first and second device based, at least in part, on the RTP phase measurements.

Another particular implementation is directed to a first device comprising: means for obtaining a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency; and means for determining a measurement of a range between the first and second device based, at least in part, on the RTP phase measurements.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
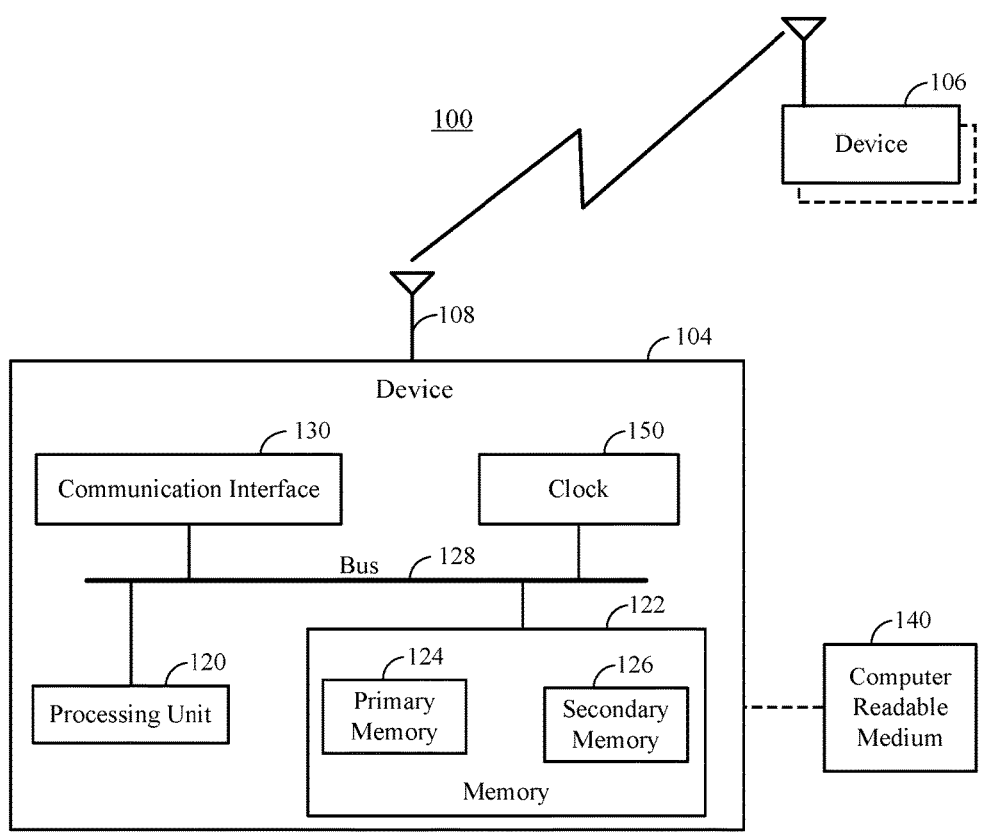
FIG. 1 is a schematic block diagram of an example computing system in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Use of RTT and RSSI measurements for ranging is very inaccurate in band limited systems such as Bluetooth. With RTT based ranging in particular, this is in part because narrow bandwidth may involve a blurring of multipath components. It is also because accuracy typically depends on determination of precise times of reception and departure in the presence of drifting clocks and complex receive chains. Accordingly, measuring ranges between devices using RTT based measurements is complex and may suffer inaccuracies in the presence of clock drift and multipath.

According to an embodiment, a range between a first and second device may be measured based, at least in part, on multiple round round-trip phase (RTP) measurements based, at least in part, on wireless tone signals transmitted between the first device and a second device. Additionally, use of multiple pairs of RTP measurements obtained with different tone signals transmitted at different carrier frequencies may enable resolving ambiguities in range measurements based on a RTP measurements with tone signals transmitted at substantially the same carrier frequency. In this context, carrier frequencies that "substantially the same" as referred to herein means carrier frequencies of different signals (such as tone signals) that deviate within a small error, or such that an error in an RTP measurement based on the different signals is easily detected or corrected. It may also be observed that phase measurements based on a carrier signal may intrinsically enable higher spatial resolution over RTT measurement techniques based on a baseband signal. Use of multiple RTP measurements based on tone signals transmitted at different frequencies may enable techniques to measure ranges between devices with reduced sensitivity to precise timing errors and with much higher spatial accuracy than is possible using conventional RTT with bandlimited signals. In particular implementations, use of multiple RTP measurements may enable sub meter accuracy range measurements, and may achieve resolution of range on the order of a few centimeters in a multipath-free environment. This may enable substantial improvement in range measurements based on RTT measurements.

FIG. 1 is a schematic diagram illustrating an example system that may include two or more devices configurable to implement techniques or processes described herein. System 100 may include, for example, a first device 104 and a second device 106, which may be operatively coupled together through a wireless communications network. In a particular implementation, as discussed below, first device 104 and second device 106 may exchange tone signals to measure or detect RTP for use in computing a measured range between first device 104 and second device 106. In an aspect, first device 104 or second device 106 may comprise any one of several different devices such as, for example, a mobile device or access point, for example. Also, in an aspect, first and second devices 104 and 106 may be included in a wireless communications network that may comprise one or more wireless access points, for example. However, claimed subject matter is not limited in scope in these respects.

First and second devices 104 and 106 may be representative of any device, appliance or machine that may be configurable to exchange data over a wireless communications network. By way of example but not limitation, any of first device 104 or second device 106 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof.

Similarly, a wireless communications network 110, as shown in FIG. 1, is representative of one or more communication links, processes, or resources configurable to support the exchange of data and measurements between at least first device 104 and second device 106. By way of example but not limitation, a wireless communications network may include wireless or wired communication links, telephone or telecommunications systems, data buses or channels, optical fibers, terrestrial or space vehicle resources, local area networks, personal area networks, wide area networks, intranets, the Internet, routers or switches, and the like, or any combination thereof. As illustrated, for example, by the dashed lined box illustrated as being partially obscured of second device 106, there may be additional like devices operatively coupled to wireless communications network 100.

It is recognized that all or part of the various devices and networks shown in FIG. 1, and the processes and methods as further described herein, may be implemented using or otherwise including hardware, firmware, software, or any combination thereof. Thus, by way of example but not limitation, first device 104 may include at least one processing unit 120 that is operatively coupled to a memory 122 through a bus 128.

Processing unit 120 is representative of one or more circuits configurable to perform at least a portion of a data computing procedure or process. By way of example but not limitation, processing unit 120 may include one or more processors, controllers, microprocessors, microcontrollers, application specific integrated circuits, digital signal processors, programmable logic devices, field programmable gate arrays, and the like, or any combination thereof.

Memory 122 is representative of any data storage mechanism. Memory 122 may include, for example, a primary memory 124 or a secondary memory 126. Primary memory 124 may include, for example, a random access memory, read only memory, etc. While illustrated in this example as being separate from processing unit 120, it should be understood that all or part of primary memory 124 may be provided within or otherwise co-located/coupled with processing unit 120. In a particular implementation, memory 122 and processing unit 120 may be configured to execute one or more aspects of process discussed herein in connection with FIG. 3.

Secondary memory 126 may include, for example, the same or similar type of memory as primary memory or one or more data storage devices or systems, such as, for example, a disk drive, an optical disc drive, a tape drive, a solid state memory drive, etc. In certain implementations, secondary memory 126 may be operatively receptive of, or otherwise configurable to couple to, a computer-readable medium 140. Computer-readable medium 140 may include, for example, any non-transitory medium that can carry or make accessible data, code or instructions for one or more of the devices in system 100. Computer-readable medium 140 may also be referred to as a storage medium.

First device 104 may further comprise a clock 150 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 150 may comprise registers, oscillators, input terminals output terminals, etc. capable of providing values indicative of a clock state. In particular embodiments, a clock state maintained at clock 150 may be used to control processes to execute application functions on in a coordinated fashion on processing unit 120. As pointed out above, a clock state maintained at clock 150 may be synchronized with clock states maintained by devices other than first device 104 (e.g., second device 106).

Figure 2:
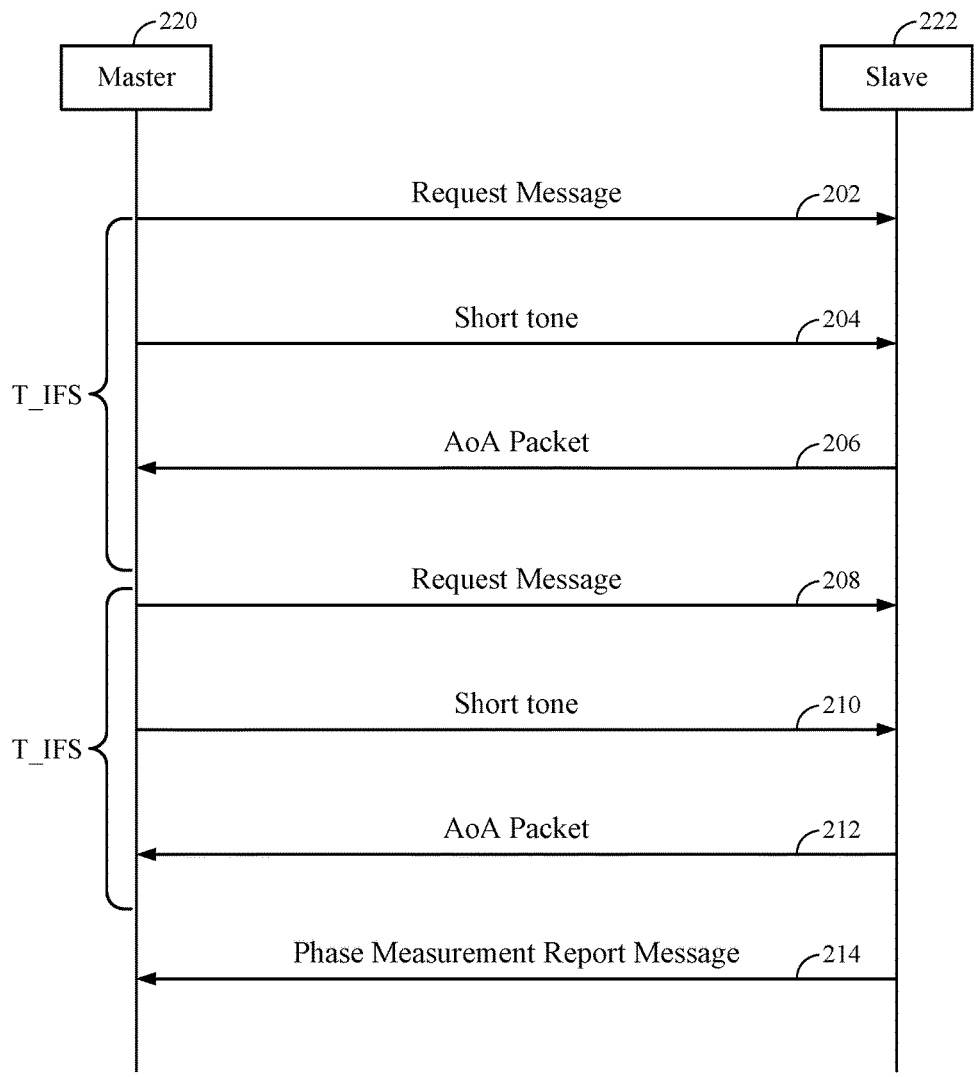
FIG. 2 is a signal flow diagram according to an embodiment.
Figure 3:
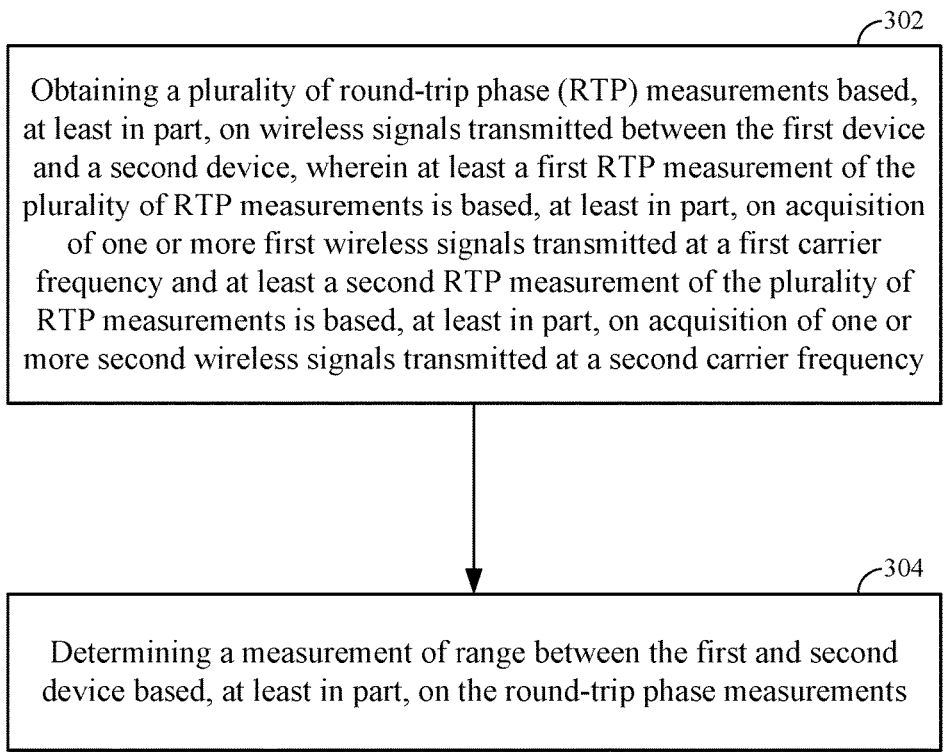
FIG. 3 is a flow diagram of processes according to a particular embodiment.

First device 104 may include, for example, a communication interface 130 that provides for or otherwise supports the operative coupling of second device 106 to a wireless communications network at least through an antenna 108. By way of example but not limitation, communication interface 130 may include a network interface device or card, a modem, a router, a switch, a transceiver, and the like. In other alternative implementations, communication interface 130 may comprise a wired/LAN interface, wireless LAN interface (e.g., IEEE std. 802.11 wireless interface), Bluetooth® interface and/or a wide area network (WAN) air interface. It should be understood, however, that these are merely examples of air interfaces that may be employed for techniques described herein, and claimed subject matter is not limited in this respect. In a particular implementation, antenna 108 in combination with communication interface 130 may be used to implement transmission and reception of signals as illustrated in FIGS. 2 and 3. In one implementation, communication interface 130 may comprise radio transceiver circuitry configurable to detect a phase of a wireless tone signal transmitted from second device 106 and received at antenna 108. Such radio transceiver circuitry may also be configurable to transmit wireless tone signals at multiple different carrier frequencies.

First device 104 may include, for example, an input/output device 132. Input/output device 132 is representative of one or more devices or features that may be configurable to accept or otherwise introduce human or machine inputs, or one or more devices or features that may be configurable to deliver or otherwise provide for human or machine outputs. By way of example but not limitation, input/output device 132 may include an operatively configured display, speaker, keyboard, mouse, trackball, touch screen, data port, etc.

According to an embodiment, aspects of the latest Bluetooth® (BT) protocol for determination of angle of arrival (AoA) may be used for measuring a range between devices based, at least in part, on measurements of round-trip signal phase obtained from wireless tone signals transmitted between first and second devices 104 and 106. Some particular aspects of the BT AoA process are as follows:

1. BT AoA packets may include one or more tones;
2. BT AoA process contains good frequency diversity due to the inbuilt frequency hopping; and
3. BT AoA process is designed to determine angle (separation may allow relative localization of two devices).

According to an embodiment, a round-trip phase (RTP) between first and second devices 104 and 106 may be computed based on two phase measurements: a first phase measurement obtained at first device 104 from acquisition of a wireless tone signal transmitted by second device 106, and a second phase measurement obtained at second device 106 from acquisition of a wireless tone signal transmitted by first device 104. This may allow cancellation of unknown phase offsets in receivers and transmitters of the respective first and second devices 104 and 106. In this context, "acquisition" of a signal as referred to herein means obtaining information from the signal received at a receiver device. For example, acquisition of a received signal may comprise detection or measurement of at least one aspect or characteristic of a signal including, for example, signal phase or received signal strength, or obtaining information decoded from the received signal, just to provide a few examples of information that may be obtained from acquisition of a signal. According to an embodiment, multiple measurements of RTP obtained from signals transmitted at different carrier frequencies may be used to compute a measured range between the first and second devices. In one implementation, this method to compute a range between devices based on RTP measurements may be implemented with minor modification to the BT AoA process as discussed below. However, this is merely an example of a type of communication format that may be used in transmitting and acquiring wireless tone signals for obtaining RTP measurements, and other communication formats may be used without deviating from claimed subject matter.

FIG. 2 is a signal flow diagram illustrating an exchange of radio frequency signals between a master device 220 and slave device 222 according to an embodiment. In one implementation, master device 220 and slave device 222 may have features such as the features of first device 104 shown in FIG. 1 and discussed above. The particular example illustrated in FIG. 2 employs some capabilities of BT enabled devices. It should be understood, however, that the particular signals discussed in the example of FIG. 2 are merely examples, and that claimed subject matter is not limited in this respect.

Master device 220 may transmit an initial request message 202 to slave device 222 requesting transmission of one or more AoA packets for use in detecting or measuring AoA of slave device relative to a reference angle. According to an embodiment, master device 220 and slave device 222 may mutually agree beforehand to a pseudorandom frequency hopping scheme in which the carrier frequencies of the AoA packets and short tone messages change among a set of predetermined frequency channels. In one particular implementation, a short tone message paired with an AoA packet (e.g., short tone message 204 paired with AoA packet 206 or short tone message 210 paired with AoA packet 212) may be transmitted with the same carrier frequency as the AoA packet. Following transmission of request message 202, master device 220 may wait a particular time period T_IFS (e.g., 150.0 μs) to receive an AoA packet from slave device 222 transmitted in response to request message 202. During this time period, master device 220 may transmit a short tone signal 204 (e.g., at a 30.0 μS duration) at a particular carrier frequency. In an embodiment, short tone signal 204 may comprise a signal transmitted at a narrow band about the particular carrier frequency. In a particular implementation, a phase of short tone signal 204 or 210 may be consistently maintained throughout transmission and reception.

According to an embodiment, slave device 222 may acquire short tone signal 204 to obtain a measurement of a phase of a first carrier signal. Similarly, master device 220 may acquire AoA packet 206 to obtain a measurement of a phase of a second carrier signal. As discussed below, the obtained measurements of the first and second carrier signals may be combined as a round-trip phase (RTP) measurement.

As pointed out above, obtaining multiple RTP measurements based on signals transmitted at different carrier frequencies may enable reducing or eliminating ambiguities in a range measurement obtained from RTP measurements based on signals transmitted at the same carrier frequency. As shown in the particular example implementation of FIG. 2, master device 220 may transmit a second request message 208 followed by transmission of a short tone signal 210. Slave device 222 may transmit a second AoA packet 212 in response to request message 208. In the particular embodiment shown in FIG. 2, requests for transmission of AoA packets from slave device 222 are provided in separate request messages 202 and 208 at distinct events. In alternative implementations, requests for transmission of multiple AoA packets may be transmitted from master device 220 in a single message. According to an embodiment, short tone signal 210 and AoA packet 212 may be transmitted at a different carrier frequency that is different from a carrier frequency of short tone signal 204 and AoA packet 206. Thus, as discussed below, an RTP measurement obtained from acquisition of short tone signal 210 and AoA packet 212 in addition an RTP measurement obtained from acquisition of short tone signal 204 and AoA packet 206 may enable reducing or eliminating ambiguities of a range measurement based on a signal RTP measurement obtained from wireless tone signals transmitted at a single carrier frequency. Here, it should be pointed out that in this context, different wireless tone signals transmitted at a "single carrier frequency" as referred to herein means that the different tone signals are transmitted at substantially the same carrier frequencies.

According to an embodiment, transmission and acquisition of short tone signal 204 and AoA packet 206 at a first carrier frequency may be used to compute a first RTP measurement, and transmission and acquisition of short tone signal 210 and AoA packet 212 at a second carrier frequency (different from the first carrier frequency) may be used to compute a second RTP measurement. It should be understood that transmission and acquisition of additional pairs of short tone messages and AoA packets (not shown) transmitted at carrier frequencies other than the first and second carrier frequencies may be used for computing one or more additional RTP measurements.

In an optional implementation, a message containing phase measurements between the master device 220 and the slave device 222 may enable computation of a range between the master device 220 and the slave device 222 at a single device. As shown in FIG. 2, for example, slave device 222 may transmit a report message 214 including phase measurements obtained from acquisition of short tone signal 204 and/or short tone signal 210. With phase measurements received in report message 214, master device 220 may determine a first RTP measurement based on acquisitions of short tone signal 204 and AoA packet 206, and may determine a second RTP measurement base on acquisitions of short tone signal 210 and AoA packet 212. Here, master device 220 may obtain the first RTP measurement by combining one more phase measurements of acquired AoA packet 206 with one or more phase measurements of shorttone signal 204 acquired at slave device 222 (obtained from report message 214). Similarly, master device 220 may obtain the second RTP measurement by combining one more phase measurements of acquired AoA packet 212 with one or more phase measurements of shorttone signal 210 acquired at slave device 222 (obtained from report message 214). Alternatively, master device 220 may transmit a report message (not shown) to slave device 222 containing phase measurements obtained from acquisition of AoA packet 206 and/or AoA packet 212 (to enable computation of a range between master device 220 and slave device 222 at slave device 222).

FIG. 3 is a flow diagram of a process to be performed at a first device (e.g., first device 104) according to an embodiment. Block 302 may obtain RTP measurements based, at least in part, on wireless tone signals transmitted between the first device and a second device (e.g., device 106). In a particular implementation, the wireless tone signals may be transmitted from a transceiver device such as a transceiver device implemented in communication interface 130, for example. In this context, a "wireless signal" comprises a signal transmitted over a wireless medium over a relatively narrow frequency band about a particular carrier frequency. In one example implementation, a wireless signal may comprise a wireless tone signal. It should be understood, however, that a wireless signal may merely permit determination of a relative phase and need not comprise a pure tone signal (e.g., having primarily a sine wave). Furthermore, in this context, an "RTP measurement" means a combination of a measurement of a phase of a first oscillating signal transmitted from a first device as received at a second device, and a phase of a second oscillating signal transmitted from the second device as received at the first device. In a particular implementation, a phase of an oscillating signal transmitted between a first device and a second device may be maintained uniformly along a signal path between the first device and the second device. In an example implementation, a carrier frequency of the first oscillating signal and a carrier frequency of the second oscillating signal may be maintained substantially the same (e.g., with minimal deviation between carrier frequencies of the first and second oscillating signals). In an example implementation, an oscillator at the first device controlling a carrier frequency of the first oscillating signal may run continuously until a phase of the second oscillating signal is detected at the first device. Likewise, an oscillator at the second device controlling a carrier frequency of the second oscillating signal may be frequency locked with carrier frequency of the received first oscillating signal and run continuously from reception of the first oscillating signal to transmission of the second oscillating signal. As illustrated above, a first RTP measurement may be obtained, at least in part, by acquisition of a first wireless tone signal (e.g., acquisition of short tone signal 204 at a transceiver device such as a transceiver device implemented in communication interface 130) transmitted by the first device and acquisition of a second wireless tone signal (e.g., acquisition of AoA packet 206 at a transceiver device such as a transceiver device implemented in communication interface 130) transmitted by the second device at a first carrier frequency. A second RTP measurement may be obtained similarly by acquisition of a third wireless tone signal (e.g., short tone signal 210) transmitted by the first device and a second wireless tone signal (e.g., AoA packet 212) transmitted by the second device at a second carrier frequency. Additional RTP measurements may be similarly obtained by acquisition of additional wireless tone signals transmitted between the first and second devices at carrier frequencies other than the first and second carrier frequencies. In addition, as discussed above, an RTP measurement may be obtained based, at least in part, on messages received at a first device (e.g., messages received at communication interface 130) comprising measured phases of wireless tone signals detected at a second device. Furthermore, block 302 may be performed, at least in part, by execution of computer-readable instructions stored on memory 122 by processing unit 120.

As pointed out above in the example implementation of FIG. 2, a RTP measurements may be obtained by a combination of phase measurements from acquisition of wireless tone signals at different devices. By one or more messages transmitted between devices (e.g., phase measurement report message 214), a first device may obtain measurements of a phase of a wireless tone signal transmitted by the first device and acquired at a second device. For example, master device 220 may receive phase measurement report message 214 containing measurements of phase of short tone signals 204 and 210 obtained at slave device 222. Master device 220 may then determine a first RTP measurement based on a measured phase of acquired AoA packet 206 and measurement of phase of short tone signal 204, and determine a second RTP measurement based on a measured phase of acquired AoA packet 212 and measurement of short tone signal 210.

According to an embodiment, a process for determining an RTP measurement as obtained at block 302 may be based, at least in part, on modeling signals transmitted between devices according to expressions (1) as follows:

$$S_A(t) = e^{-i(\omega_A t + \varphi_A)}$$

$$S_B(t) = e^{-i(\omega_B t + \varphi_B)} \quad (1)$$

Where:
$S_A(t)$ is a signal transmitted from an antenna of a device A;
$S_B(t)$ is a signal transmitted from an antenna of a device B;
$\omega_A$ is the carrier angular frequency ($\omega_A = 2\pi f_A$);
$\varphi_A$ is an unknown phase offset;
$\omega_B$ is the carrier angular frequency ($\omega_B = 2\pi f_B$);
$\varphi_B$ is an unknown phase offset; and
t is absolute time.

According to an embodiment, carrier signal $S_A(t)$ transmitted from the antenna of device A and as received at the antenna of device B may be modeled according to expression (2) as follows:

$$S_A(t,b) = e^{i(k_A(b-a) - \omega_A t - \varphi_A)} \quad (2)$$

Where:
$k_A$ is a carrier angular wavenumber ($k_A = 2\pi/\lambda_A$); and
(b-a) is a range between devices A and B.

Considering that device B receiving $S_A(t)$ at a range (b-a) from device A, the phase of the received signal relative to the phase of its own carrier signal $S_B(t)$ may be expressed based on the conjugate of $S_B(t)$ according to expression (3) as follows:

$$\Psi_{AB} = S_A(t_A, b) S_B^*(t_A) \quad (3)$$

$$= e^{i(k_A(b-a) - \omega_A t_A - \varphi_A)} e^{i(\omega_B t_A + \varphi_B)}$$

$$= e^{i(k_A(b-a) - (\omega_A - \omega_B)t_A - (\varphi_A - \varphi_B))},$$

where $t_A$ is an absolute time at which a measurement of $\Psi_{AB}$ is obtained.

Also considering that the receiving device B, and without resetting a carrier clock, transmits $S_B(t)$ to device A, the phase of received $S_B(t)$ relative to the phase of $S_A(t)$ as measured at device A may be modeled according to expression (4) as follows:

$$\Psi_{BA} = S_B(t_B, a) S_A^*(t_B) \quad (4)$$

$$= e^{i(-k_B(a-b) - \omega_B t_B - \varphi_B)} e^{i(\omega_A t_B + \varphi_A)}$$

$$= e^{i(k_A(b-a) - (\omega_B - \omega_A)t_B - (\varphi_B - \varphi_A))},$$

where $t_B$ is an absolute time at which $\Psi_{BA}$ is obtained.

According to an embodiment, a measurement of RTP based on signal $S_A(t)$ transmitted from device A and received at device B, and on signal $S_B(t)$ transmitted from device B and received at device A may be obtained by multiplying $\Psi_{AB}$ and $\Psi_{BA}$ according to expression (5) as follows:

$$\Psi_{AB}\Psi_{BA} = e^{i((k_A + k_B)(b-a) - (\omega_A - \omega_B)(t_A - t_B))}, \quad (5)$$

where the measured RTP $\phi$ at carrier frequency $\omega_A/\omega_B$ is given by expression (6) as follows:

$$\phi = (k_A + k_B)(b - a) - (\omega_A - \omega_B)(t_A - t_B) \quad (6)$$

$$= 2\bar{k}D - \Delta\omega\Delta t + 2\pi N,$$

where:
D is the separation between devices A and B;
$\Delta\omega$ is the angular frequency difference in carriers transmitted by devices A and B;
$\Delta t$ is the time interval between the two measurements;
$\bar{k}$ is the average wavenumber between devices A and B; and
N is an unknown integer.

As pointed out above, carrier frequencies that are substantially the same (e.g., carrier frequencies of tone signals transmitted by devices A and B to measure RTP according to expression (6)) may differ within a small error. According to an embodiment, the term $\Delta\omega\Delta t$ may be treated as a clock correction term. If $\Delta\omega\Delta t$ may be assumed to be small, block 304 may determine a range D between first and second devices expressed according to expression (7) as follows:

$$D = \frac{\lambda\phi}{4\pi} - \frac{\lambda N}{2}, \quad (7)$$

where $\lambda$ is a carrier wavelength.

As may be observed, the expression of D according to expression (7), based on an RTP measurement $\phi$ from signals transmitted at a single carrier frequency, is ambiguous as N is an unknown integer. As pointed out above, obtaining an additional RTP measurement based on signals transmitted at a different carrier frequency may enable reducing or eliminating this ambiguity. Here, D may be expressed using two different RTP measurements $\phi_1$ and $\phi_2$ at carrier frequencies $2\pi/\lambda_1$ and $2\pi/\lambda_2$ according to expressions (8) and (9) as follows:

$$D = \frac{\lambda_1 \phi_1}{4\pi} - \frac{\lambda_1 N_1}{2} \quad (8)$$

$$D = \frac{\lambda_2 \phi_2}{4\pi} - \frac{\lambda_2 N_2}{2} \quad (9)$$

where:
$\lambda_1$ is a wavelength of the carriers of tone signals for tone signals acquired for determining RTP $\phi_1$;

$\lambda_2$ is a wavelength of the carriers of tone signals for tone signals acquired for determining RTP $\phi_2$; and $N_1$ and $N_2$ are integers.

According to an embodiment, block 304 may at least partially resolve ambiguities in expressions of D according to expressions (8) and (9) by, for example, determining values for $N_1$ and $N_2$ such that different computations for D according to expressions (7) and (8) are close or substantially equal.

Figure 4A:
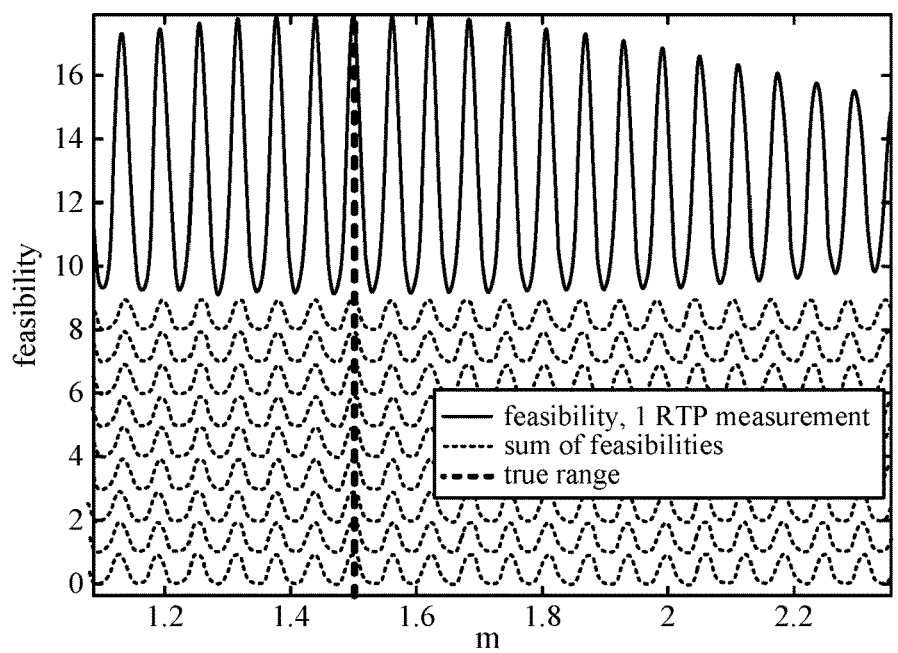
FIGS. 4A and 4B are plots illustrating sums of functions based on range hypotheses for selecting a range from among the range hypotheses according to an embodiment.
Figure 4B:
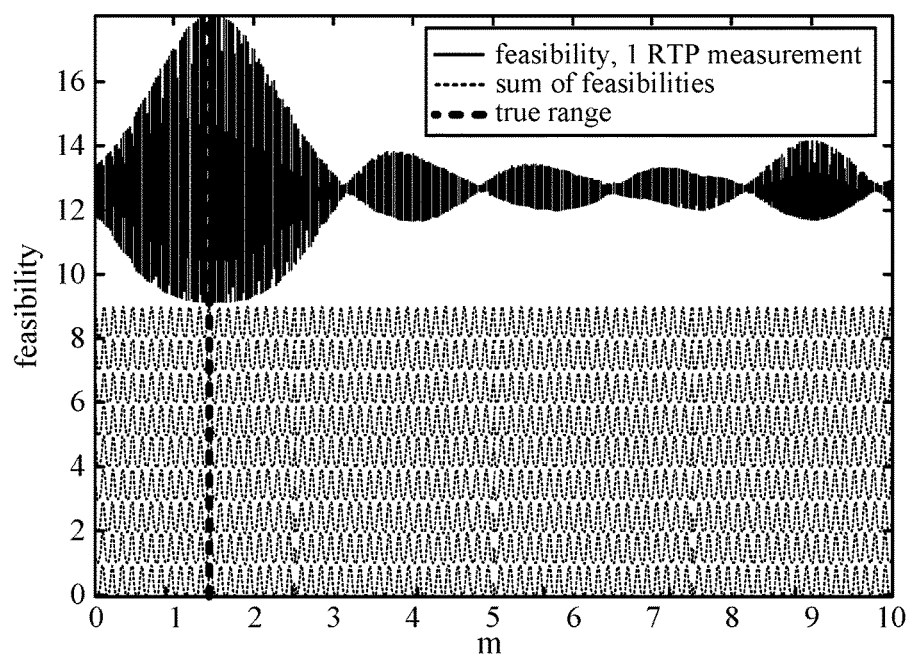

As may be observed, expressions (8) and (9) may be used to generate different series' of hypotheses for D spaced at increments of $\lambda_1/2$ and $\lambda_2/2$. In one embodiment, three or more RTP measurements may be obtained using three or more different carrier frequencies to similarly generate three or more series' of hypotheses for D. According to an embodiment, for each series of hypotheses based on a carrier frequency, a comb function may comprise teeth of a particular width centered on hypotheses for D. Alternatively, comb functions may comprise a series of Gaussian functions centered at different hypotheses for D as illustrated in the plots of FIGS. 4A and 4B. Here, plots for comb functions for corresponding RTP measurements identified as "sum of feasibilities" may be added to generate the "feasibility" plot. As shown, a peak of the feasibility plot may indicate a true range. Values of the different comb functions (based on corresponding RTP measurements obtained using corresponding different carriers) may be added to generate a peak profile. One or more possible values for D may be selected based, at least in part, on local maximum peaks in the peak profile. Any remaining ambiguities may be resolved by application of additional constraints such as, for example, a maximum limit for D based on effective limits of a transmission range of the two devices, received signal strength, just to provide a few examples.

As pointed out above, computations of D according to expressions (7), (8) and (9) rely on a small clock correction term $\Delta\omega\Delta t$ for a resulting RTP measurement $\phi$. According to an embodiment, an estimate of clock correction term $\Delta\omega\Delta t$ for an RTP measurement $\phi$ based on measurements of a particular carrier frequency may be determined and applied to $\phi$ in determining hypotheses for D based on expressions (6), (7) and (8). Here, an estimate of $\Delta\omega$ may be determined according to expression (10) as follows:

$$\Delta\omega = (\chi_{AB}(t_{A2}) - \chi_{AB}(t_{A1}))/(t_{A1} - t_{A2}), \quad (10)$$

where:

$\chi_{AB}(t_{A1})$ is an individual phase measurement obtained at time $t_{A1}$; and $\chi_{AB}(t_{A2})$ is an individual phase measurement obtained at time $t_{A2}$.

Determination of the $\Delta t$ term from the correction term $\Delta\omega\Delta t$ may involve timing measurements made on different devices. However, the bulk of the time delay between two phase measurements obtained at different devices may be modeled as a measurable gap between a time of an initial measurement at a first receiving device and time of transmission back to a second receiving device. Once transmission is initiated the transit time and the measurement should take place within a few µS. Therefore the time between measurement and re-transmission in the second device may provide a sufficient approximation of $\Delta t$. Additional sources of error determination of a RTP measurement $\phi$ may include an error in individual phase measurements. This may be correct using knowledge of the phase error (if indeed known) or through a single calibration procedure.

According to an embodiment, actions performed at block 304 may be performed, at least in part, by a processor executing computer readable instructions (e.g., by processing unit 120 executing computer readable instructions stored on memory 122).

The particular examples discussed above are directed to determining a range between devices based on RTP measurements obtained from acquisition of wireless tone signals transmitted using a BT signaling format. It should be understood, however, other implementations may be directed to determining a range between devices based on RTP measurements obtained from acquisition of wireless tone signals transmitted using other formats such as, for example, IEEE 802.11 or other signaling formats.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, remote control, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method at a first device comprising:
    obtaining a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency, and wherein the first carrier frequency and the second carrier frequency are different and are selected from different predetermined frequency channels; and
    determining a measurement of a range between the first and second device based, at least in part, on the RTP measurements.

2. The method of claim 1, wherein determining the measurement of the range further comprises:
    generating a first plurality of hypotheses of the range based, at least in part, on the first RTP measurement;
    generating a second plurality of hypotheses of the range based, at least in part, on the second RTP measurement; and
    combining the first plurality of hypotheses of the range and the second hypotheses of the range to, at least in part, reduce an ambiguity in the measurement of the range.

3. The method of claim 2, wherein combining the first plurality of hypotheses of range and the second hypotheses of range further comprises:
    mapping the first hypotheses to first functions centered on the first hypotheses;

mapping the second hypotheses to second functions centered on the second hypotheses; and combining the first and second functions to generate one or more local peaks.

4. The method of claim 2, wherein the first plurality of hypotheses of the range are separated based, at least in part, on the first carrier frequency, and wherein the second plurality of hypotheses of the range are separated based, at least in part, on the second carrier frequency.

5. The method of claim 1, wherein at least one of the one or more first wireless signals comprises one or more Bluetooth angle of arrival (AoA) packets transmitted from the second device.

6. The method of claim 5, wherein at least one of the one or more first wireless signals comprises one or more wireless signals transmitted from the first device following transmission of a request message from the first device initiating transmission of the one or more Bluetooth AoA packets.

7. The method of claim 1, wherein at least one of the one or more first wireless signals are transmitted according to IEEE std. 802.11.

8. The method of claim 1, wherein obtaining the plurality of RTP measurements further comprises:

receiving one or more messages from the second device comprising one or more measurements based, at least in part, on acquisition at the second device of one or more third wireless signals transmitted by the first device and one or more measurements based, at least in part, on acquisition at the second device of one or more fourth wireless signal transmitted by the first device;

combining the one or more measurements based, at least in part, on acquisition at the second device of one or more third wireless signals with one or more measurements obtained from acquisition of the one or more first wireless signals to determine a first RTP measurement; and combining the one or more measurements based, at least in part, on acquisition at the second device of one or more fourth wireless signals with one or more measurements obtained from acquisition of the one or more second wireless signals to determine a second RTP measurement.

9. The method of claim 8, wherein the one or more third wireless signals are transmitted at about the first carrier frequency and the one or more fourth wireless signals are transmitted at about the second carrier frequency.

10. A first device comprising:
a transceiver device; and
one or more processing units configured to:
obtain a plurality of round-trip phase (RTP) measurements based, at least in part, on wireless signals transmitted between the first device and a second device, wherein at least a first RTP measurement of the plurality of RTP measurements is based, at least in part, on acquisition at the transceiver device of one or more first wireless signals transmitted at a first carrier frequency and at least a second RTP measurement of the plurality of RTP measurements is based, at least in part, on acquisition at the transceiver device of one or more second wireless signals transmitted at a second carrier frequency, and wherein the first carrier frequency and the second carrier frequency are different and are selected from different predetermined frequency channels; and determine a measurement of a range between the first and second device based, at least in part, on the RTP measurements.

11. The first device of claim 10, wherein the one or more processing units are further configured to:
generate a first plurality of hypotheses of the range based, at least in part, on the first RTP measurement;
generate a second plurality of hypotheses of the range based, at least in part, on the second RTP measurement; and
combine the first plurality of hypotheses of the range and the second hypotheses of the range to, at least in part, reduce an ambiguity in the measurement of the range.

12. The first device of claim 11, wherein the one or more processing units are further configured to:
map the first hypotheses to first functions centered on the first hypotheses;
map the second hypotheses to second functions centered on the second hypotheses; and
combine the first and second functions to generate one or more local peaks.

13. The first device of claim 11, wherein the first plurality of hypotheses of the range are separated based, at least in part, on the first carrier frequency, and wherein the second plurality of hypotheses of the range are separated based, at least in part, on the second carrier frequency.

14. The first device of claim 10, wherein at least one of the one or more first wireless signals comprises one or more Bluetooth angle of arrival (AoA) packets transmitted from the second device.

15. The first device of claim 14, wherein at least one of the one or more first wireless signals comprises one or more wireless signals transmitted from the first device following transmission of a request message from the first device initiating transmission of the one or more Bluetooth AoA packets.

16. The first device of claim 10, wherein at least one of the one or more first wireless signals are transmitted according to IEEE std. 802.11.

17. A non-transitory storage medium comprising computer-readable instructions stored thereon which are executable by a processing unit of a first device to:

obtain a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency, and wherein the first carrier frequency and the second carrier frequency are different and are selected from different predetermined frequency channels; and determine a measurement of a range between the first and second device based, at least in part, on the RTP measurements.

18. The storage medium of claim 17, wherein the instructions are further executable by the processing unit to:
generate a first plurality of hypotheses of the range based, at least in part, on the first RTP measurement;
generate a second plurality of hypotheses of the range based, at least in part, on the second RTP measurement; and
combine the first plurality of hypotheses of the range and the second hypotheses of the range to, at least in part, reduce an ambiguity in the measurement of the range.

19. The storage medium of claim 18, wherein the instructions are further executable by the processing unit to:
- map the first hypotheses to first functions centered on the first hypotheses;
- map the second hypotheses to second functions centered on the second hypotheses; and
- combine the first and second functions to generate one or more local peaks.

20. The storage medium of claim 18, wherein the first plurality of hypotheses of the range are separated based, at least in part, on the first carrier frequency, and wherein the second plurality of hypotheses of the range are separated based, at least in part, on the second carrier frequency.

21. The storage medium of claim 17, wherein at least one of the one or more first wireless signals comprises one or more Bluetooth angle of arrival (AoA) packets transmitted from the second device.

22. The storage medium of claim 21, wherein at least one of the one or more first wireless signals comprises one or more wireless signals transmitted from the first device following transmission of a request message from the first device initiating transmission of the one or more Bluetooth AoA packets.

23. The storage medium of claim 17, wherein at least one of the one or more first wireless signals are transmitted according to IEEE std. 802.11.

24. A first device comprising:
- means for obtaining a plurality of round-trip phase (RTP) measurements based, at least in part, on wireless signals transmitted between the first device and a second device, wherein at least a first RTP measurement of the plurality of RTP measurements is based, at least in part, on acquisition of one or more first wireless signals transmitted at a first carrier frequency and at least a second RTP measurement of the plurality of RTP measurements is based, at least in part, on acquisition of one or more second wireless signals transmitted at a second carrier frequency, and wherein the first carrier frequency and the second carrier frequency are different and are selected from different predetermined frequency channels; and
- means for determining a measurement of a range between the first and second device based, at least in part, on the RTP measurements.

25. The first device of claim 24, wherein the means for determining the measurement of the range further comprises:
- means for generating a first plurality of hypotheses of the range based, at least in part, on the first RTP measurement;
- means for generating a second plurality of hypotheses of the range based, at least in part, on the second RTP measurement; and
- means for combining the first plurality of hypotheses of the range and the second hypotheses of the range to, at least in part, reduce an ambiguity in the measurement of the range.

26. The first device of claim 25, wherein the means for combining the first plurality of hypotheses of range and the second hypotheses of range further comprises:
- means for mapping the first hypotheses to first functions centered on the first hypotheses;
- means for mapping the second hypotheses to second functions centered on the second hypotheses; and
- means for combining the first and second functions to generate one or more local peaks.

27. The first device of claim 25, wherein the first plurality of hypotheses of the range are separated based, at least in part, on the first carrier frequency, and wherein the second plurality of hypotheses of the range are separated based, at least in part, on the second carrier frequency.

28. The first device of claim 24, wherein at least one of the one or more first wireless signals comprises one or more Bluetooth angle of arrival (AoA) packets transmitted from the second device.

29. The first device of claim 28, wherein at least one of the one or more first wireless signals comprises one or more wireless signals transmitted from the first device following transmission of a request message from the first device initiating transmission of the one or more Bluetooth AoA packets.

30. The first device of claim 24, wherein at least one of the one or more first wireless signals are transmitted according to IEEE std. 802.11.

* * * * *